(12) United States Patent
Abdulrahim et al.

(10) Patent No.: US 11,035,581 B1
(45) Date of Patent: Jun. 15, 2021

(54) INTEGRATED DESALINATION AND AIR CONDITIONING SYSTEM

(71) Applicant: KUWAIT INSTITUTE FOR SCIENTIFIC RESEARCH, Safat (KW)

(72) Inventors: Hassan Kamal Abdulrahim, Safat (KW); Mansour Ahmed, Safat (KW)

(73) Assignee: KUWAIT INSTITUTE FOR SCIENTIFIC RESEARCH, Safat (KW)

( * ) Notice: Subject to any disclaimer, the term of this patent is extended or adjusted under 35 U.S.C. 154(b) by 0 days.

(21) Appl. No.: 17/136,571

(22) Filed: Dec. 29, 2020

(51) Int. Cl.
*F24F 3/14* (2006.01)
*F24F 5/00* (2006.01)
(Continued)

(52) U.S. Cl.
CPC .......... *F24F 3/1411* (2013.01); *F24F 5/0046* (2013.01); *F25B 15/06* (2013.01);
(Continued)

(58) Field of Classification Search
CPC ....... F24F 3/1411; F24F 5/0046; F25B 15/06; F25B 27/007; F25B 39/00; C02F 2103/08; C02F 1/14; B01D 5/006
See application file for complete search history.

(56) References Cited

U.S. PATENT DOCUMENTS

| 4,280,331 A | 7/1981 | Yoshii et al. | |
| 2015/0047963 A1* | 2/2015 | Roch | C02F 1/10 202/185.1 |
| 2019/0351347 A1* | 11/2019 | Antar | B01D 1/28 |

FOREIGN PATENT DOCUMENTS

| CN | 101344298 A | * 11/2007 |
| CN | 103512264 A | * 11/2007 |

(Continued)

OTHER PUBLICATIONS

Novel and efficient integration of a humidification-dehumidificationdesalination system with an absorption refrigeration system, Qasem et al, Applied Energy, Feb. 2020.*
Thermal desalination and air conditioning using absorption cycle, Hassan et al, Desalination and Water Treatment (2014).*
CN 103512264A translation.*
CN101344298A translation.*
(Continued)

*Primary Examiner* — Elizabeth J Martin
(74) *Attorney, Agent, or Firm* — Nath, Goldberg & Meyer; Richard C. Litman

(57) ABSTRACT

The integrated desalination and air conditioning system can provide desalinated (fresh) water, cold air or both in a single efficient system. The system incorporates a humidification-dehumidification (HdH) desalination system with a water-lithium bromide ($H_2O$—LiBr) vapor absorption cycle (AbC) system. The AbC system includes an AbC generator that provides a heating source for an AbC condenser that heats the air input of the HdH; two AbC absorbers that provide heating sources for the feed seawater; a first AbC evaporator that provides a cooling source for the humidified air produced in the HdH; and a second AbC evaporator that provides a cooling source for use outside the system. The heat input for the AbC generator can be provided by low-grade heat sources, such as waste heat or solar thermal energy. The system is capable of producing fresh water and/or cold air at different capacities, depending on water demands and cooling load requirements.

18 Claims, 6 Drawing Sheets

(51) Int. Cl.
*F25B 15/06* (2006.01)
*F25B 39/00* (2006.01)
*F25B 27/02* (2006.01)
*F25B 27/00* (2006.01)
*C02F 1/14* (2006.01)
*C02F 103/08* (2006.01)
*C02F 1/16* (2006.01)

(52) U.S. Cl.
CPC .......... *F25B 27/007* (2013.01); *F25B 27/02* (2013.01); *F25B 39/00* (2013.01); *C02F 1/14* (2013.01); *C02F 1/16* (2013.01); *C02F 2103/08* (2013.01); *F24F 2005/0064* (2013.01)

(56) References Cited

FOREIGN PATENT DOCUMENTS

| CN | 201634527 U | 11/2010 |
| CN | 104180555 A | 12/2014 |
| CN | 206783460 U | 12/2017 |
| CN | 107655235 A | 2/2018 |
| JP | 2010036174 A | 2/2010 |

OTHER PUBLICATIONS

Wang et al., "Proposal and analysis of a high-efficiency combined desalination and refrigeration system based on the LiBr-H2O absorption cycle—Part 1: System configuration and mathematical model," Energy Conversion and Management, vol. 52, Issue 1, Jan. 2011, pp. 220-227.
Srinivas, "Influence of vapor absorption cooling on humidification-dehumidification (HDH) desalination," Alexandria Engineering Journal, vol. 55, Issue 3, Sep. 2016, pp. 1961-1967.
Abdulrahim et al., "Thermal desalination and air conditioning using absorption cycle". Desalination and Water Treatment (2015), vol. 55, Iss. 12, pp. 3310-3329.
Su et al., "An innovative solar-powered absorption refrigeration system combined with liquid dessicant dehumidification for cooling and water", Energy Conversion and Management (2017), vol. 153, pp. 515-525.
Yassen, "Integrated Solar Absorption Cooling and Membrane Distillation Systems—A Theoretical Study", King Fahd University of Petroleum & Minerals M.S. Thesis (2016), esp. pp. 18-29.

\* cited by examiner

INTEGRATED DESALINATION AND AIR CONDITIONING SYSTEM

BACKGROUND

1. Field

The disclosure of the present patent application relates generally to desalination systems and air conditioning systems, and particularly to an integrated desalination and air conditioning system.

2. Description of the Related Art

Water scarcity, as well as uncomfortable and even deadly heat, are particular issues in hot climates, such as in arid and semi-arid regions. Existing desalination systems and air conditioning systems both require large energy sources to perform their intended functions and a larger footprint area to house their separate systems. In addition, if the energy sources for these systems are provided by fossil fuels, there are environmental, health and safety impacts that must be considered. Conventional thermal desalination technologies operating at high temperatures, require expensive materials of construction, and also face scaling, fouling, and corrosion challenges. Conventional, standalone humidification-dehumidification (HdH) desalination systems have a limited water recovery ratio due to energy requirements to heat the feed water and heat and cool the air. Conventional air conditioning systems normally reject thermal heat energy to the environment from the condenser, while conventional HdH systems require thermal energy for heating the air and feed water.

Thus, an integrated desalination and air conditioning system solving the aforementioned problems is desired.

SUMMARY

The integrated desalination and air conditioning system can provide desalinated (fresh) water only, or cooling effect only for air conditioning in the form of cold air and chilled water, or both fresh water and air conditioning in a single efficient system. The system incorporates a humidification-dehumidification (HdH) desalination system with a water-lithium bromide (LiBr) vapor absorption cycle (AbC) system. Combining and integrating both systems allows the HdH system to utilize the rejected thermal energy from the AbC system, which reduces the energy consumption of the integrated system. The AbC system includes: an AbC generator to separate water vapor from an LiBr solution and provides a heating source for an AbC condenser that heats the atmospheric air input of the HdH; two AbC absorbers that absorb the refrigerant vapor from the evaporators and provide heating sources for the feed seawater; a first AbC evaporator that provides a cooling source for the humidified air produced in the HdH and produces fresh water; and a second AbC evaporator that provides a cooling source for chilled water to be used outside the system. The heat input for the AbC generator can be a direct heat source or a motive steam input and can be provided by low-grade heat sources, such as waste heat or solar thermal energy. The integrated desalination and air conditioning system is capable of producing fresh water and providing a cooling effect (desalination/air conditioning mode) at varying capacities, depending on the drinking water demands and corresponding cooling load requirements By combining desalination and air conditioning in a single system, capital and operating expenses are reduced when compared to standalone HdH desalination and air conditioning systems. In addition, the compact design of the system can be easily containerized and used as a portable desalination and air conditioning system.

These and other features of the present subject matter will become readily apparent upon further review of the following specification and drawings.

BRIEF DESCRIPTION OF THE DRAWING

Similar reference characters denote corresponding features consistently throughout the attached drawings.

DETAILED DESCRIPTION OF THE PREFERRED EMBODIMENTS

Figure 1:
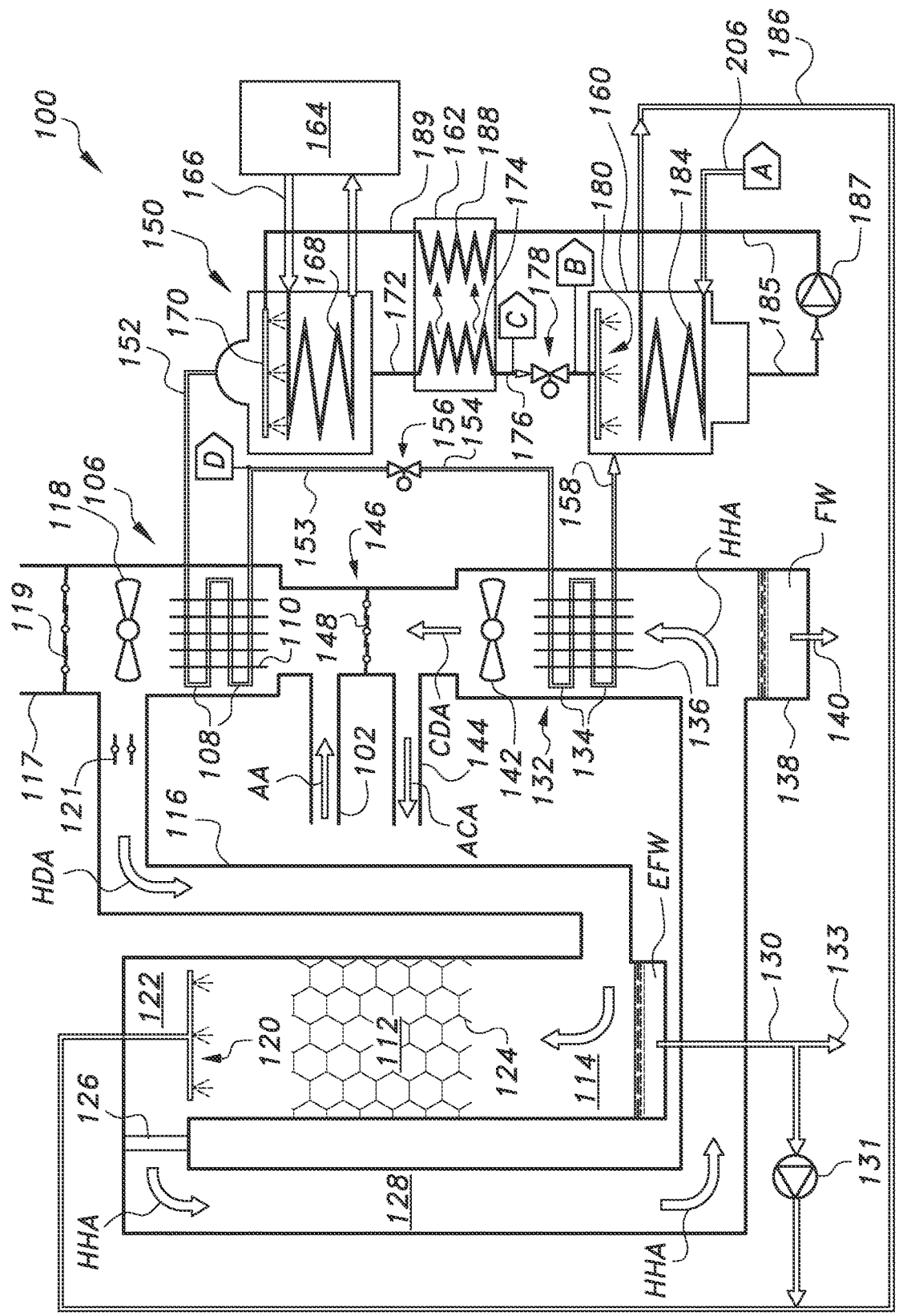
FIGS. 1 and 2 are a schematic diagram of an integrated desalination and air conditioning system, shown operating in a combined desalination and cooling mode or configuration.
Figure 2:
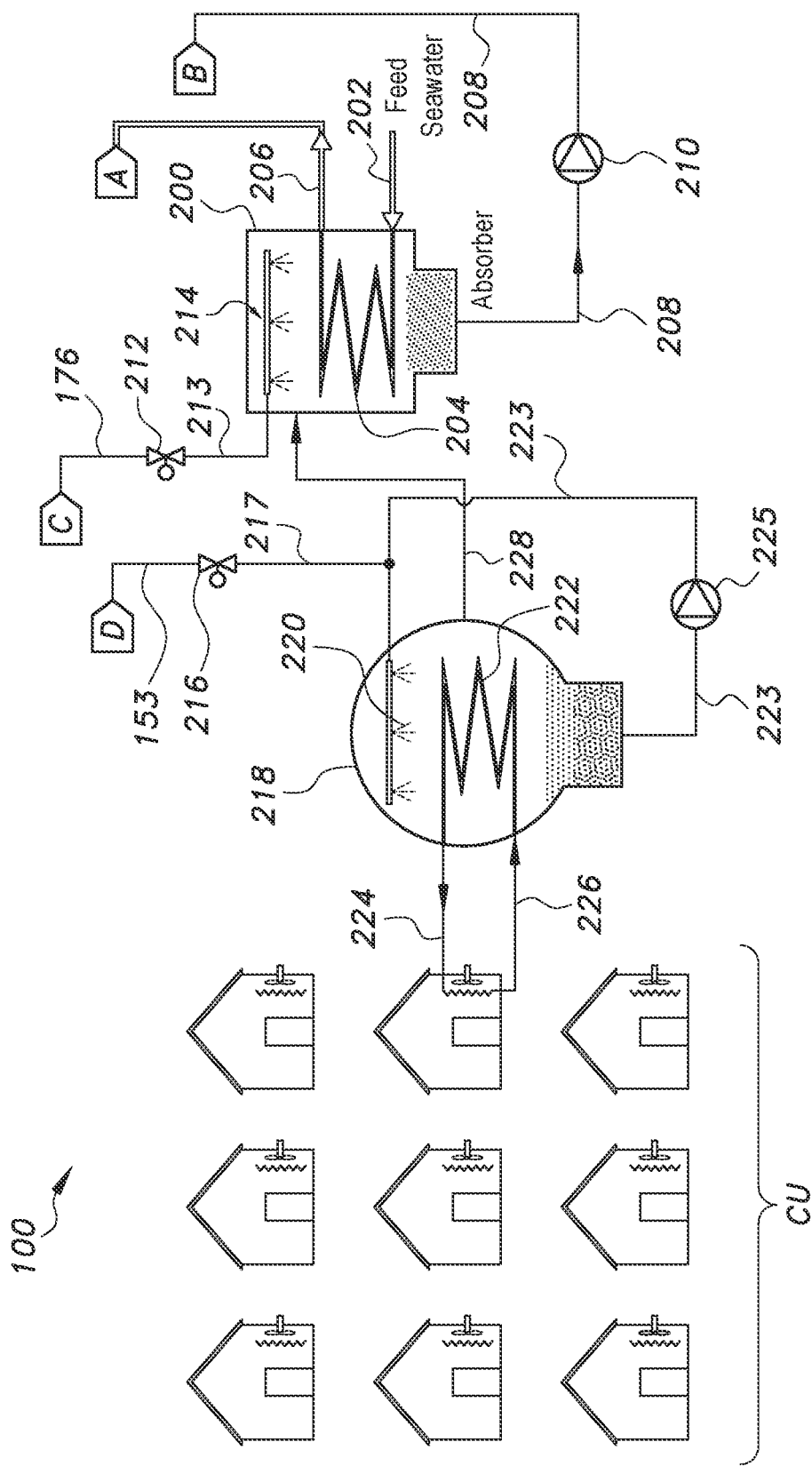

The integrated desalination and air conditioning system 100 is shown in FIGS. 1 and 2 in a combined desalination and cooling mode or configuration. The air handling portion (the humidification-dehumidification (HdH) desalination system) of the integrated system 100 will be described first with respect to FIG. 1, followed by a description of the liquid handling portion (the water-lithium bromide (LiBr) vapor absorption cycle (AbC) system) of the integrated system 100. Atmospheric air AA or other outside air source is introduced to the system 100 via a first duct 102 using a first blower 118 such that AA flows over the AbC condenser 106. The air is heated sensibly by coils 108 of the AbC condenser 106, which include fins 110 to increase heat transfer to the air. The air exits the AbC condenser 106 as hot dry air HDA. The temperature of the air exiting the AbC condenser 106 is dependent on the amount of desalination and cooling required.

The hot and dry air HDA with an atmospheric amount of water vapor (as humidity) is directed by a first fan 118 to the bottom 114 of a humidification column 112 via a second duct 116 in the combined desalination and cooling mode, as the first damper 119 is closed and the second damper 121 is open. Seawater spray nozzles 120 at the top 122 of the humidification column 112 spray heated feed seawater downward into the humidification column 112, thereby increasing the air humidity and producing hot and humid air HHA. The interior of the humidification column 112 may include packing material 124 to increase the residence time of the water in contact with the air, so the hot, dry air HDA will be humidified with the maximum possible amount of water vapor. A demister 126 at the top 122 of the humidification column 112 prevents the passage of any water droplets into the duct 128. The excess feed water EFW is collected at the bottom of the humidification column 112 and exits via a brine pipe 130 and is either recycled in the system 100 or is rejected as brine, as described further below.

The hot and humid air HHA is routed to an AbC evaporator 132 by the duct 128 and is cooled by coils 134 of the AbC evaporator 132, which include fins 136 to increase heat transfer from the air. The water vapor condensed by the AbC evaporator 132 produces fresh water FW, which is collected in a product water tank 138 underneath the AbC evaporator 132. A fresh water pipe 140 can supply the fresh water FW from the water tank 138 to municipal water or other fresh water systems.

The resulting cold and dry air CDA from the AbC evaporator 132 is directed by a second fan 142 for use as air conditioning or cooling air in one of two ways. All or a portion of the cold and dry air CDA can be directed as air conditioning air ACA to the desired air conditioned space via a duct 144. Alternatively, the cold and dry air CDA can be used in an air-to-air heat exchanger (not shown) for sensibly cooling the atmospheric air AA to the desired temperature prior to entering the air-conditioned space. A third damper 146 between the AbC evaporator 132 and the AbC condenser 106 includes a plurality of vanes 148. Normally, in the combined desalination and cooling mode, the third damper 146 is closed. However, during extremely hot weather the third damper 146 can be opened and closed to control the amount of cold and dry air CDA mixed with the atmospheric air AA, for cooling the atmospheric air AA prior to entering the AbC condenser 106 to improve the heat transfer of the AbC condenser 106.

The liquid handling portion (the water-lithium bromide (LiBr) vapor absorption cycle (AbC) system) of the integrated system 100 will now be described with respect to FIGS. 1 and 2. An AbC generator 150 separates the water from the diluted LiBr solution and provides superheated steam to the coils 108 of the AbC condenser 106 via a water vapor pipe 152 for heating the atmospheric air AA (and possibly some of the cold dry air CDA during extremely hot weather), as described above. The cool air condenses the superheated steam to a saturated liquid that is divided into two streams. One stream is supplied to the first refrigerant expansion valve (REV) 156 via saturated liquid pipe 153. The REV 156 throttles the liquid to a low pressure and temperature liquid-vapor mixture that flows to the coils 134 of the AbC evaporator 132 via a first saturated liquid-vapor mixture pipe 154. The other stream of the saturated liquid is supplied to a second evaporator 218, shown in FIG. 2, via the saturated liquid pipe 153, a second REV 216 and a second saturated liquid-vapor mixture pipe 217. The condensed refrigerant is throttled in the refrigerant expansion valves 156, 216 to a very low pressure (<1 kPa) corresponding to each evaporator according to the required temperature in the evaporator, producing a cold water-vapor mixture at a temperature less than 3° C. The refrigerant (cold liquid-vapor mixture) from the first refrigerant expansion valve 156 flows through the coils 134 of the AbC evaporator 132, thereby cooling the hot and humid air HHA to condense the water vapor from the air producing fresh water, and the cold and dry air CDA, as described above. The refrigerant leaves the coils 134 of the AbC evaporator 132 as a saturated vapor and is supplied to a first AbC absorber 160 via a first vapor pipe 158.

As shown in FIG. 2, the refrigerant from the second refrigerant expansion valve 216 is supplied to a sprayer 220 (via the second saturated liquid-vapor mixture pipe 217) in the second evaporator 218 and is sprayed on coils 222 of the second evaporator 218, thereby cooling the water flowing in the coils 222 to produce chilled water for the air conditioning application outside system 100. The chilled water is supplied to one or more consumer cooling units (CUs) via a chilled water supply pipe 224, and after use, the chilled water (now heated) from the one or more CUs is returned to the coils 222 via a refrigerant return pipe 226 and a system of pumps and valves (not shown). The chilled water is used in the one or more CUs to produce cold air for air conditioning the CUs. The CUs include pumps, fans and controlling valves for producing air conditioning using the chilled water. A recirculation pump 225 may be used in the evaporator 218 to recirculate the refrigerant flow to the sprayer 220 via pipe 223, to be sprayed on the coils 222. The refrigerant leaves the second evaporator 218 as a saturated vapor and is supplied to a second AbC absorber 200 via a second vapor pipe 228.

The absorption cycle of the integrated desalination and air conditioning system 100 is a modified single-effect-type, using the AbC generator 150, the AbC condenser 106, the AbC evaporators 132, 218, the AbC absorbers 160, 200, and a solution heat exchanger 162. Motive steam or heat is provided to the AbC generator 150 from a heat source 164 via pipe 166. The heat source 164 may be a low-grade heat source, such as industrial waste heat or solar heat sources. The motive steam is fed through a coil 168 in the AbC generator 150 to heat a diluted LiBr solution provided by a LiBr solution sprayer 170. The heat from the motive steam separates the refrigerant (water vapor) from the diluted LiBr solution. The produced superheated steam is directed to the coils 108 of the AbC condenser 106, as described above. The remaining concentrated LiBr solution flows to heat-producing coils 174 of the heat exchanger 162 via a concentrated LiBr solution pipe 172. The cooled concentrated LiBr solution is divided into two streams. One stream is fed to the first AbC absorber 160 via a cooled concentrated LiBr solution pipe 176 and a first solution expansion valve (SEV) 178. The cooled concentrated LiBr solution is sprayed into the top of the first AbC absorber 160 via solution spray nozzles 180. In the first AbC absorber 160, the water vapor supplied to the first AbC absorber 160 from the coils 134 of the AbC evaporator 132 is absorbed by the sprayed concentrated LiBr solution. The concentrated LiBr solution then becomes a diluted LiBr solution.

As the absorption process in the AbC absorber 160 is an exothermic process, cooling is required. A source of cold seawater from the sea is supplied to heated seawater coils 204 of the second AbC absorber 200 by a cold seawater pipe 202. It should be noted that while the cooling water is noted as being seawater, other sources of salt water, fresh water and even industrial wastewater may be used as the cooling water supplied to pipe 202. The seawater from the heated seawater coils 204 of the second AbC absorber 200 is supplied to the seawater coils 184 of the first AbC absorber 160 by a second heated seawater pipe 206, and is further heated by the exothermic process. The cooled diluted LiBr solution from the bottom of the first AbC absorber 160 is supplied to heat absorbing coils 188 of the heat exchanger 162 via a first diluted LiBr solution pipe 185 and a first diluted LiBr solution pump 187. The solution pump 187 provides a pressure suitable for the AbC generator 150.

The cooled, concentrated LiBr solution is also fed to the second AbC absorber 200 via the cooled concentrated LiBr solution pipe 176, a second SEV (solution expansion valve) 212 and pipe 213. The cooled concentrated LiBr solution is sprayed into the top of the second AbC absorber 200 via solution spray nozzles 214. In the second AbC absorber 200, the water vapor supplied to the second AbC absorber 200 from the second evaporator 218 is absorbed by the sprayed concentrated LiBr solution. As in the first AbC absorber 160, the absorption process in the second AbC absorber 200 is an exothermic process, and the seawater in the seawater coils is heated before being directed to the seawater coils 184 of the first AbC absorber 160. The cooled diluted LiBr solution from the bottom of the second AbC absorber 200 is supplied to the solution spray nozzles of the first AbC absorber 160 via a second diluted LiBr solution pipe 208 and a second diluted LiBr solution pump 210. The diluted LiBr solution from the AbC absorber 160 absorbs heat from the concentrated LiBr solution flowing in the heat producing coils 174 of the heat exchanger 162 before being routed to the LiBr sprayer 170 via a heated diluted LiBr solution pipe 189 to be sprayed on the coil 168 of the AbC generator 150 tubes to separate the water vapor from the solution, as described above.

The process heated seawater from the seawater coils 184 is supplied to the seawater spray nozzles 120 at the top 122 of the humidification column 112 via a heated seawater pipe 186. Additional seawater can be provided to the seawater spray nozzles 120 from the excess feed water EFW collected at the bottom of the humidification column 112 via the brine pipe 130 and a brine pump 131. Excess brine can be removed from the integrated desalination and air conditioning system 100 from the brine pipe 130 via a brine drain 133 for further processing into a salt product, or for other uses.

As previously noted, the integrated desalination and air conditioning system 100 is capable of producing fresh water, (desalination only mode), cooling effect (chilled water), (air conditioning only mode) or both fresh water and cooling effect (chilled water and CDA) (desalination/air conditioning mode). In the desalination/air conditioning mode, all of the above components are included and activated and operate in the manner described above.

Figure 3:
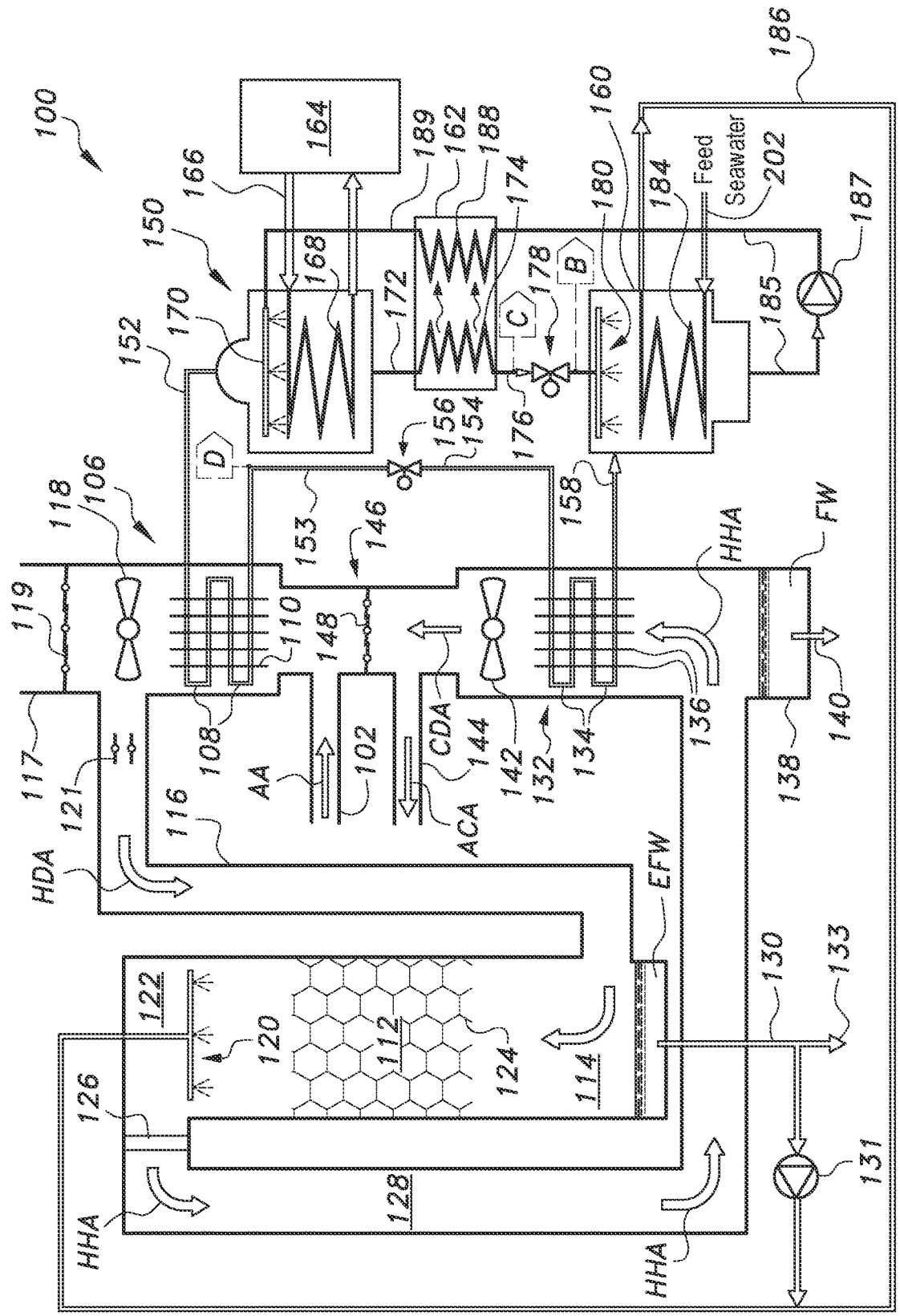
FIGS. 3 and 4 are a schematic diagram of the integrated desalination and air conditioning system of FIGS. 1 and 2, showing the system operating in a desalination only mode or configuration.
Figure 4:
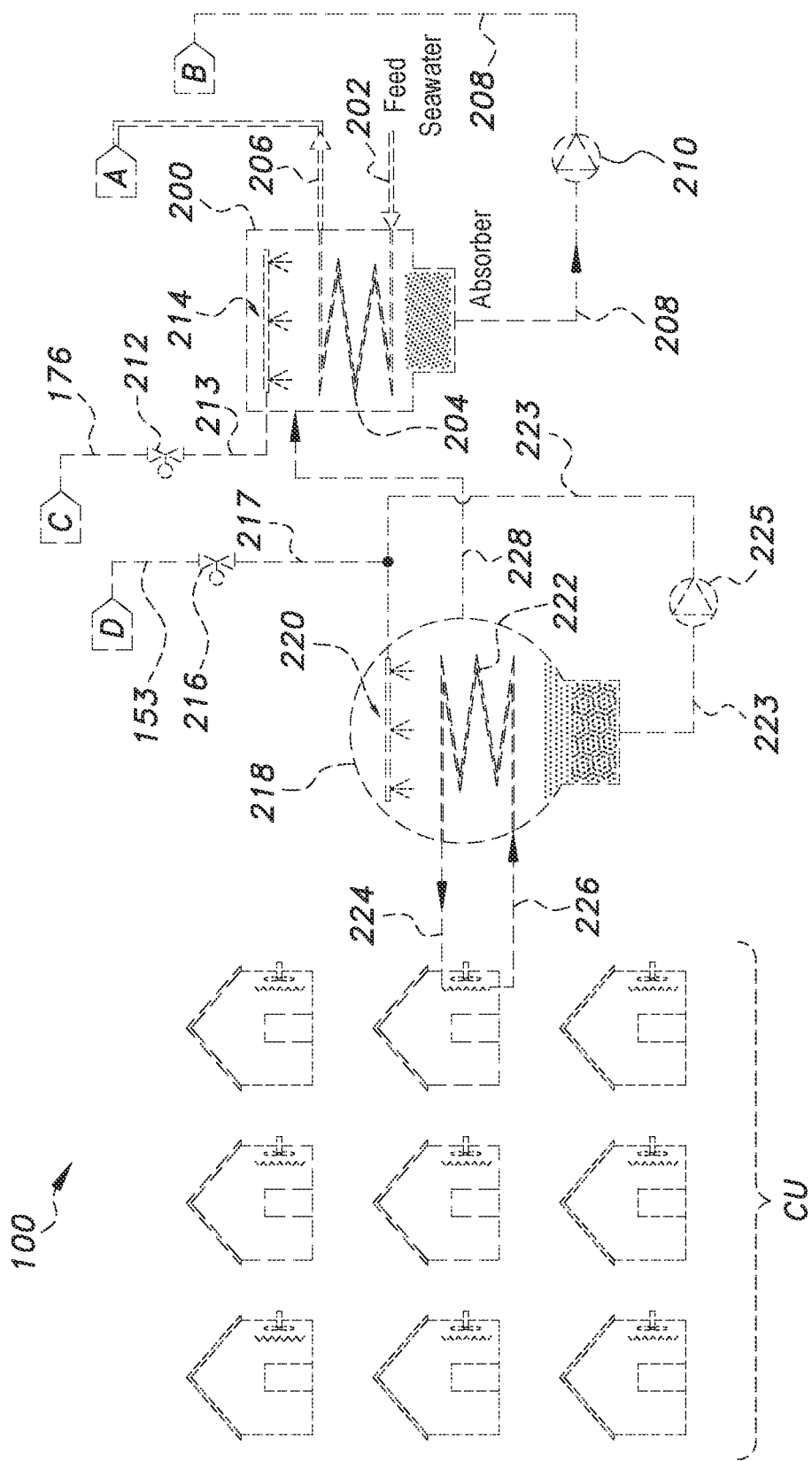

As shown in FIGS. 3-4, in the desalination only mode (or configuration), the first damper 119 is closed, the second damper 121 is open and the third damper 146 operates normally, as described above. The second AbC absorber 200, the second SEV 212, the second REV 216, the second evaporator 218 (and attached CUs), the recirculation pump 225 and the second diluted LiBr solution pump 210 (and associated pipes) can be eliminated for a desalination only configuration and the seawater is fed directly to the seawater coils 184 of the first AbC absorber 160 via pipe 202. Alternatively, valves (not shown) may be provided and closed just before the second SEV 212, and the second REV 216 and the second diluted LiBr solution pump 210 can be deactivated for operating in the desalination only mode. The seawater is routed directly to the seawater coils 184 of the first AbC absorber 160, using valves (not shown) to bypass the seawater coils 204 of the second AbC absorber 200.

Figure 5:
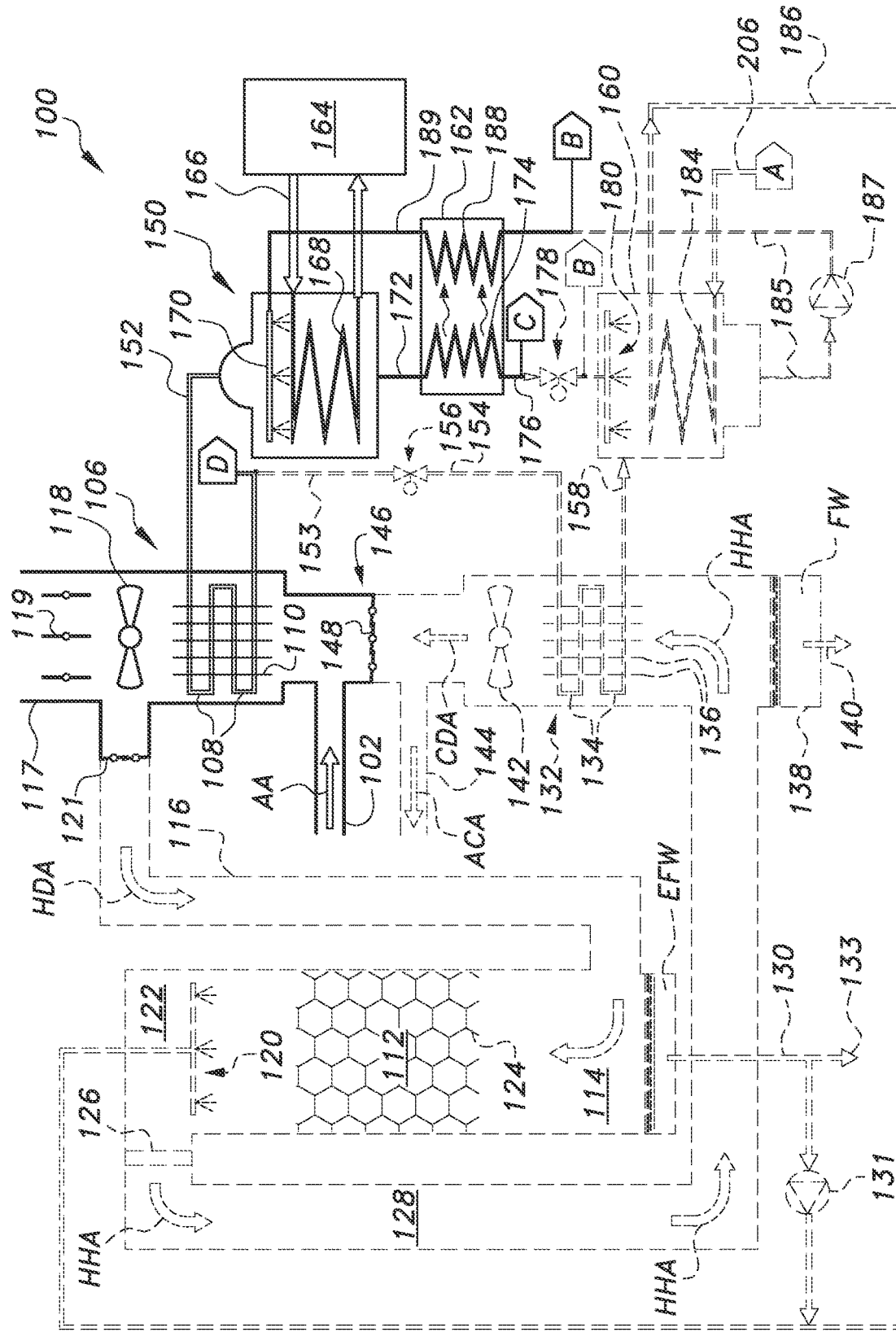
FIGS. 5 and 6 are a schematic diagram of the integrated desalination and air conditioning system of FIGS. 1 and 2, showing the system in a cooling only mode or configuration.
Figure 6:
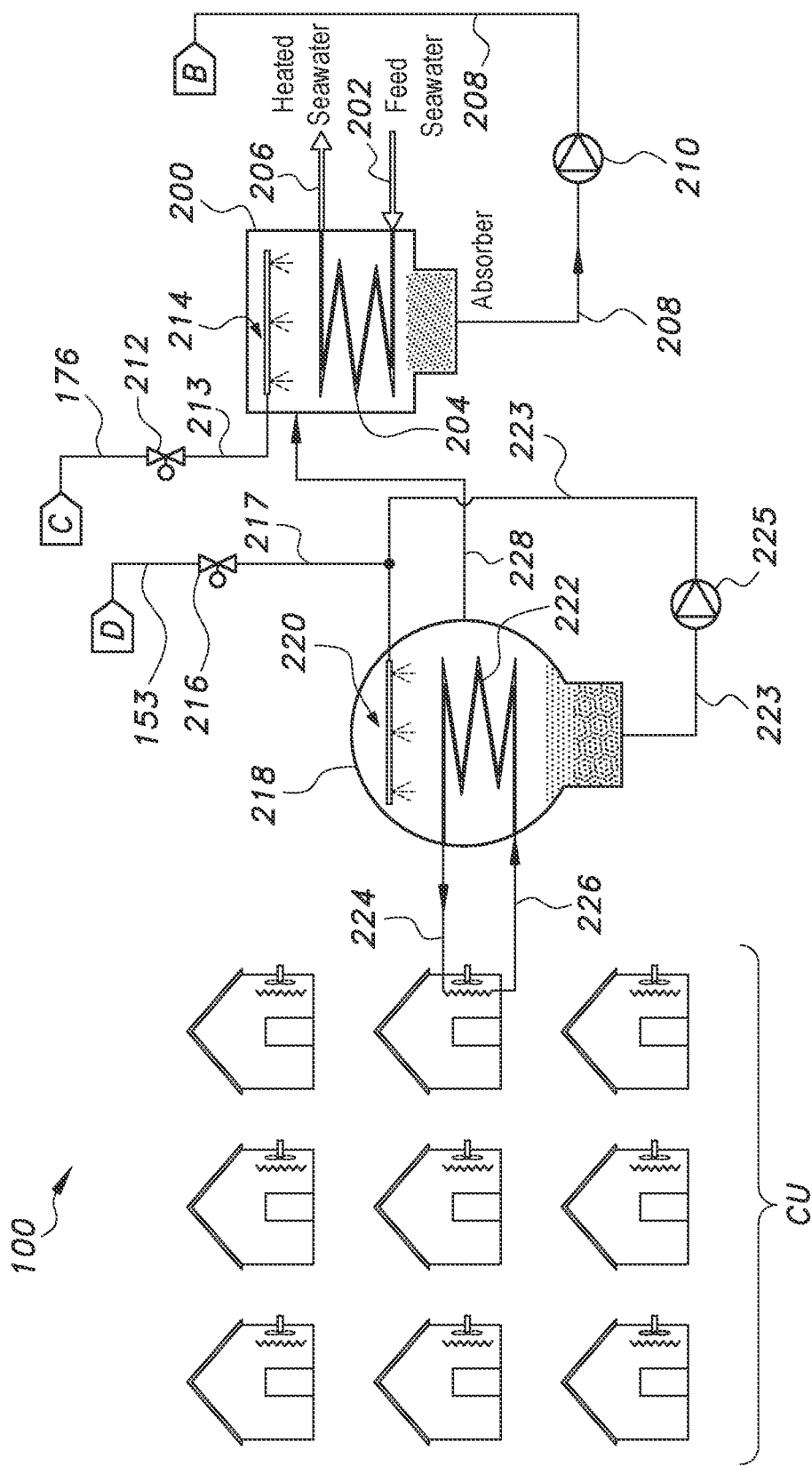

As shown in FIGS. 5-6, in the cooling only mode or configuration, the first damper 119 is open, the second damper 121 is closed, and the third damper 146 is closed. The first AbC absorber 160, the first SEV 178, the first REV 156, the first diluted LiBr solution pump 187, the humidification column 112, the demister 126, the first evaporator 132, the third fan 142 and the associated ductwork can be eliminated for a cooling only configuration, and the heated seawater from the seawater coils 204 of the second AbC absorber 200 can be vented out of the integrated desalination and air conditioning system 100 for use in other systems or dumped to the drainage sump, as desired. The cooled diluted LiBr solution from the bottom of the second AbC absorber 200 is supplied directly to the heat absorbing coils 188 of the heat exchanger 162 via solution pump 210 and conduit 208, as shown in FIGS. 5-6. Alternatively, valves (not shown) may be provided and closed just before the first SEV 178, and the first REV 156 and the first diluted LiBr solution pump 187 can be deactivated for operating in the cooling only mode. The seawater may still be supplied to the seawater coils 204 of the second AbC absorber 200, and a valve (not shown) can direct the seawater from the seawater coils 204 to be vented out of the system 100.

It is to be understood that the integrated desalination and air conditioning system is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. An integrated desalination and air conditioning system, comprising:
    a humidification-dehumidification desalination system, including:
        a first air input duct for supplying outside air to the desalination system;
        a vapor absorption cycle (AbC) condenser for heating the outside air supplied by the first air duct, the AbC condenser having a plurality of condenser coils;
        a humidification column having an interior, a top, a bottom and seawater spray nozzles at the top of the humidification column;
        a second air duct providing a conduit directing heated air from the AbC condenser to the bottom of the humidification column;
        a first AbC evaporator for cooling heated humid air from the top of the humidification column, the first AbC evaporator having a first plurality of evaporator coils;
        a third air duct directing heated humid air from the top of the humidification column to the first AbC evaporator;
        a fourth air duct directing cold and dry air from the first AbC evaporator to a predetermined location, the predetermined location defining an air conditioned space;
        a product water tank underneath the first AbC evaporator for collecting fresh water condensed by the first plurality of evaporator coils; and
    a water-lithium bromide vapor absorption cycle system, including:
        an AbC generator having:
            a solution sprayer for spraying a diluted LiBr solution; and
            means for receiving heat from a heat source to separate water vapor from the diluted LiBr solution, thereby forming a concentrated LiBr solution;
        a water vapor pipe extending between the AbC generator and the AbC condenser coils, providing the water vapor to the condenser coils;
        a saturated liquid pipe extending between the AbC condenser coils and the first plurality of evaporator coils;
        a first refrigerant expansion valve in the saturated liquid pipe for providing very low pressure cold water to the first plurality of evaporator coils;
        a first AbC absorber having:
            first solution spray nozzles for spraying the concentrated LiBr solution; and
            first seawater heating coils;
        a first vapor pipe extending between the first plurality of evaporator coils and the first AbC absorber for providing water vapor from the first plurality of evaporator coils to the first AbC absorber;

a solution heat exchanger having:
  heat producing coils; and
  heat absorbing coils;
a concentrated LiBr solution pipe extending between the AbC generator and the heat producing coils, providing the concentrated LiBr solution to the heat producing coils to produce a cooled, concentrated LiBr solution;
a cooled, concentrated LiBr solution pipe extending between the heat producing coils and the first solution spray nozzles of the first AbC absorber, providing the cooled, concentrated LiBr solution to the first solution spray nozzles, the water vapor from the first plurality of evaporator coils being absorbed by the cooled concentrated LiBr solution, producing heat and the diluted LiBr solution;
a first solution expansion valve in the cooled, concentrated LiBr solution pipe;
a first diluted LiBr solution pipe extending between the first AbC absorber and the heat absorbing coils;
a first diluted LiBr solution pump in the first diluted LiBr solution pipe for pumping the diluted LiBr solution to the heat absorbing coils, the diluted LiBr solution being heated in the heat absorbing coils by the concentrated LiBr solution in the heat producing coils;
a heated, diluted LiBr solution pipe extending between the heat absorbing coils and the solution sprayer of the AbC generator for providing the heated diluted LiBr solution to the AbC generator solution sprayer;
a cold seawater pipe extending between a source of cooling water and the first seawater heating coils to provide seawater to the first seawater heating coils to produce heated seawater;
a first heated seawater pipe extending between the first seawater heating coils and the seawater spray nozzles at the top of the humidification column, providing the heated seawater to the seawater spray nozzles; and a second heated seawater pipe defining a conduit for heated seawater from seawater heating coils of a second AbC absorber to the first heating seawater coils of the first AbC absorber.

2. The integrated desalination and air conditioning system as recited in claim 1, further comprising a demister at the top of the humidification column to prevent passage of any water droplets into the third air duct.

3. The integrated desalination and air conditioning system as recited in claim 1, further comprising packing material in the interior of the humidification column, the packing material increasing the residence time of the heated seawater from the seawater spray nozzles with the heated air from the AbC condenser.

4. The integrated desalination and air conditioning system as recited in claim 1, further comprising a brine pipe extending from the bottom of the humidification column, for draining excess feed water from the humidification column.

5. The integrated desalination and air conditioning system as recited in claim 4, further comprising a brine pump directing excess feed water from the brine pipe into the first heated seawater pipe, the excess feed water being mixed with the heated seawater for dispensing by the seawater spray nozzles at the top of the humidification column.

6. The integrated desalination and air conditioning system as recited in claim 5, further comprising a brine drain connected to the brine pipe, excess brine being drained from the integrated desalination and air conditioning system, via the brine drain.

7. The integrated desalination and air conditioning system as recited in claim 1, further comprising a fresh water pipe extending from the product water tank to an external water system.

8. The integrated desalination and air conditioning system as recited in claim 1, further comprising:
  an exhaust duct in the second air duct;
  a first damper in the exhaust duct;
  a second damper in the second air duct between the humidification column and the AbC condenser, the first damper and the second damper each having an open position and a closed position so that:
  when the first damper is closed and the second damper is open, the heated air from the AbC condenser is fed to the bottom of the humidification column via the second duct; and
  when the first damper is open and the second damper is closed, the heated air from the AbC condenser is vented out of the integrated desalination and air conditioning system via the exhaust duct.

9. The integrated desalination and air conditioning system as recited in claim 8, further comprising a third damper between the first AbC evaporator and the AbC condenser, the third damper having a plurality of vanes for controlling an amount of cold and dry air from the first AbC evaporator to be mixed with the outside air entering the AbC condenser.

10. The integrated desalination and air conditioning system as recited in claim 9, further comprising a first fan for blowing the outside air from the first air input duct to the AbC condenser.

11. The integrated desalination and air conditioning system as recited in claim 10, further comprising a second fan for directing the hot and dry air from the AbC condenser to the bottom of the humidification column when the first damper is closed and the second damper is open or out of the integrated desalination and air conditioning system via the exhaust duct when the first damper is open and the second damper is closed.

12. The integrated desalination and air conditioning system as recited in claim 11, further comprising a third fan for blowing the cold and dry air from the AbC evaporator to the fourth air duct and to the AbC condenser when the third damper is at least partially open.

13. The integrated desalination and air conditioning system as recited in claim 9, further comprising:
  a second evaporator having:
  a second evaporator sprayer; and
  second evaporator coils containing a refrigerant; and
  a second refrigerant expansion valve in the saturated liquid pipe for providing very low pressure cold water refrigerant to the second evaporator sprayer, so that the low pressure cold water is sprayed on the second evaporator coils by the second evaporator sprayer, thereby chilling the water in the second evaporator coils and converting the low pressure cold refrigerant to a saturated vapor.

14. The integrated desalination and air conditioning system as recited in claim 13, further comprising:
  a chilled water supply pipe for supplying chilled water from the second evaporator coils to at least one consumer cooling unit; and
  a chilled water return pipe for supplying heated chilled water from the at least one consumer cooling unit to the second evaporator coils.

15. The integrated desalination and air conditioning system as recited in claim 13, further comprising:

the second AbC absorber having: second solution spray nozzles; and the second seawater coils;

a second vapor pipe for supplying the saturated vapor refrigerant from the second evaporator to the second AbC absorber;

a second solution expansion valve for supplying the cooled concentrated LiBr solution from the cooled, concentrated LiBr solution pipe to the second solution spray nozzles, the water vapor from the first plurality of evaporator coils being absorbed by the cooled concentrated LiBr solution, producing heat and the diluted LiBr solution;

a second diluted LiBr solution pipe extending between the second AbC absorber and the first solution spray nozzles of the first AbC absorber; and a second diluted LiBr solution pump in the second diluted LiBr solution pipe for supplying the diluted LiBr solution from the second AbC absorber to the first solution spray nozzles of the first AbC absorber.

16. The integrated desalination and air conditioning system as recited in claim 1, wherein the cold seawater pipe extends directly between the source of cooling water and the seawater coils of the first AbC absorber.

17. The integrated desalination and air conditioning system as recited in claim 1, wherein the heat source is a low-grade heat source, chosen from the group consisting of waste heat and solar thermal energy.

18. An integrated desalination and air conditioning system, comprising:
a first air input duct supplying outside air to the desalination system;
a vapor absorption cycle condenser for heating the outside air, the vapor absorption cycle condenser having a plurality of condenser coils;
a humidification column having an interior, a top, a bottom and seawater spray nozzles at the top of the humidification column;
a second air duct directing heated air from the AbC condenser to the bottom of the humidification column;
a first AbC evaporator for cooling heated humid air from the top of the humidification column, the first AbC evaporator having a first plurality of evaporator coils;
a third air duct directing heated humid air from the top of the humidification column to the first AbC evaporator;
a fourth air duct for directing cold and dry air from the first AbC evaporator to a predetermined location, the predetermined location defines an air conditioned space;
an exhaust duct in the second air duct;
an AbC generator having:
a solution sprayer for spraying a diluted LiBr solution; and
means for receiving heat from a heat source to separate heated water vapor from the diluted LiBr solution, thereby forming a concentrated LiBr solution;
a water vapor pipe extending between the AbC generator and the AbC condenser coils, to provide the water vapor to the AbC condenser coils;
a saturated liquid pipe extending between the AbC condenser coils and the first AbC evaporator coils;
a first refrigerant expansion valve in the saturated liquid pipe for providing very low pressure, cold water to the first AbC evaporator coils;
a first AbC absorber having:
first solution spray nozzles for spraying the concentrated LiBr solution; and
first seawater heating coils;

a first vapor pipe extending between the first AbC evaporator coils and the first AbC absorber for providing water vapor from the first AbC evaporator coils to the first AbC absorber;
a solution heat exchanger having:
heat producing coils; and
heat absorbing coils;
a concentrated LiBr solution pipe extending between the AbC generator and the heat producing coils for providing the concentrated LiBr solution to the heat producing coils to produce a cooled concentrated LiBr solution;
a cooled, concentrated LiBr solution pipe extending between the heat producing coils and the first AbC absorber solution spray nozzles for providing the cooled concentrated LiBr solution to the first AbC absorber solution spray nozzles, the water vapor from the first AbC evaporator coils being absorbed by the cooled, concentrated LiBr solution, producing heat and the diluted LiBr solution;
a first solution expansion valve in the cooled, concentrated LiBr solution pipe;
a first diluted LiBr solution pipe extending between the AbC absorber and the heat absorbing coils;
a first diluted LiBr solution pump in the first diluted LiBr solution pipe for pumping the diluted LiBr solution to the heat absorbing coils, the diluted LiBr solution being heated in the heat absorbing coils by the concentrated LiBr solution in the heat producing coils;
a heated, diluted LiBr solution pipe extending between the heat absorbing coils and the solution sprayer of the AbC generator for providing the heated, diluted LiBr solution to the AbC generator solution sprayer;
a second evaporator having:
a second evaporator sprayer; and
second evaporator coils containing a refrigerant;
a second refrigerant expansion valve in the saturated liquid pipe for providing very low pressure cold water refrigerant to the second evaporator sprayer, wherein the low pressure cold water refrigerant is sprayed on the second evaporator coils by the second evaporator sprayer, thereby cooling the heated chilled water in the second evaporator coils and converting the low pressure cold refrigerant to a saturated vapor;
a second AbC absorber having:
second solution spray nozzles; and
second seawater heating coils;
a second vapor pipe for supplying the saturated vapor from the second evaporator to the second AbC absorber;
a second solution expansion valve for supplying the cooled concentrated LiBr solution from the cooled, concentrated LiBr solution pipe to the second solution spray nozzles, the water vapor from the first plurality of evaporator coils being absorbed by the cooled concentrated LiBr solution, producing heat and the diluted LiBr solution;
a second diluted LiBr solution pipe extending between the second AbC absorber and the first solution spray nozzles of the first AbC absorber;
a second diluted LiBr solution pump in the second diluted LiBr solution pipe for supplying the cooled diluted LiBr solution from the second AbC absorber to the first solution spray nozzles of the first AbC absorber;
a cold seawater pipe extending between a source of cooling water and the second seawater heating coils to provide seawater to the second seawater heating coils to produce heated seawater;
a first heated seawater pipe extending between the first seawater heating coils and the seawater spray nozzles at the top of the humidification column for providing the heated seawater to the seawater spray nozzles; and
a second heated seawater pipe extending between the first seawater coils of the first AbC absorber and the second seawater coils of the second AbC absorber.

* * * * *